US011401983B2

(12) United States Patent
Huitema et al.

(10) Patent No.: US 11,401,983 B2
(45) Date of Patent: Aug. 2, 2022

(54) MAGNETICALLY ACTUATED CLUTCH FOR AN ADDITIVE MANUFACTURING SYSTEM

(71) Applicant: Ultimaker B.V., Utrecht (NL)

(72) Inventors: Robert Huitema, Beneden Leeuwen (NL); Johan Andreas Versteegh, Geldermalsen (NL); Erik van der Zalm, Eindhoven (NL); Matthijs Neut, Zeist (NL); Teun van Beek, Zutphen (NL); Martijn Elserman, Geldermalsen (NL)

(73) Assignee: Ultimaker B.V., Utrecht (NL)

( * ) Notice: Subject to any disclaimer, the term of this patent is extended or adjusted under 35 U.S.C. 154(b) by 0 days.

(21) Appl. No.: 17/299,792

(22) PCT Filed: Dec. 17, 2019

(86) PCT No.: PCT/NL2019/050844
§ 371 (c)(1),
(2) Date: Jun. 4, 2021

(87) PCT Pub. No.: WO2020/130811
PCT Pub. Date: Jun. 25, 2020

(65) Prior Publication Data
US 2022/0042554 A1 Feb. 10, 2022

(30) Foreign Application Priority Data

Dec. 20, 2018 (NL) ..................... 2022252

(51) Int. Cl.
*F16D 27/00* (2006.01)
*B33Y 30/00* (2015.01)
(Continued)

(52) U.S. Cl.
CPC .......... *F16D 27/004* (2013.01); *B29C 64/209* (2017.08); *B33Y 30/00* (2014.12);
(Continued)

(58) Field of Classification Search
CPC ...... F16D 27/004; F16D 27/01; F16D 27/102; F16D 27/10; F16D 27/14; F16D 41/064;
(Continued)

(56) References Cited

U.S. PATENT DOCUMENTS 2,410,818 A 11/1946 Grant, Jr.
3,432,016 A 3/1969 Vogt
(Continued)

FOREIGN PATENT DOCUMENTS

| CN | 202040233 U | 11/2011 |
| CN | 202040234 U | 11/2011 |
| DE | 19729620 A1 | 1/1998 |

*Primary Examiner* — Timothy Hannon
(74) *Attorney, Agent, or Firm* — N.V. Nederlandsch Octrooibureau

(57) ABSTRACT

A bidirectional magnetic clutch for an additive manufacturing system, comprising a concentric arrangement of an inner drive member (2) and an outer drive member (3) enclosing the inner drive member (2), the inner and outer drive members (2,3) being rotatable relative to each other. The inner drive member (2) comprises at least two outward facing recesses (5, 6) and the outer drive member (3) comprises at least two inward facing recesses (8,9). Each outward facing recess (5,6) comprises a radially moveable roller member (10,11) of ferromagnetic material. The inner drive member (2) further comprises a magnetic biasing system (12) configured to magnetically bias the roller members (10,11) into the outward facing recesses (5,6). The bidirectional magnetic clutch further comprises a magnet actuator (13) at least partially circumferentially arranged around the outer drive member (3) and configured to maintain an engaged state or disengaged state of the bidirectional magnetic clutch.

15 Claims, 9 Drawing Sheets

(51) Int. Cl.
    *B29C 64/209* (2017.01)
    *F16D 27/14* (2006.01)
    *F16D 41/08* (2006.01)
    *F16D 27/01* (2006.01)
    *F16D 41/064* (2006.01)

(52) U.S. Cl.
    CPC ............ *F16D 27/01* (2013.01); *F16D 27/14* (2013.01); *F16D 41/088* (2013.01); *F16D 2027/008* (2013.01); *F16D 2041/0646* (2013.01); *F16D 2200/0008* (2013.01)

(58) Field of Classification Search
    CPC ........ F16D 41/08; F16D 41/086; F16D 41/10; F16D 41/105; F16D 41/088; F16D 2041/0646; B33Y 30/00; B29C 64/209
    See application file for complete search history.

(56) References Cited

U.S. PATENT DOCUMENTS

| | | |
|---|---|---|
| 5,638,931 A | 6/1997 | Kerr |
| 5,651,437 A | 7/1997 | Organek et al. |
| 5,862,903 A | 1/1999 | Gruden et al. |
| 8,418,825 B2 | 4/2013 | Bird |
| 9,816,571 B1 | 11/2017 | Neal et al. |

MAGNETICALLY ACTUATED CLUTCH FOR AN ADDITIVE MANUFACTURING SYSTEM

FIELD OF THE INVENTION

The present invention relates to a magnetic clutch for an additive manufacturing system, in particular a bidirectional magnetic clutch for an additive manufacturing system. In a further aspect the present invention relates to an extruder head for an additive manufacturing system comprising such a bidirectional magnetic clutch.

BACKGROUND ART

U.S. Pat. No. 9,816,571 B1 discloses bidirectional coupler that selectively couples and decouples a driving element to a driven element. The coupler includes an outer shaft having an outer shaft slot and an inner shaft having an inner shaft slot, where the inner and outer shafts are configured to rotate independently of each other. The coupler also includes a ball bearing provided within the inner shaft slot and having a size so that when the ball bearing is located at a center portion of the inner shaft slot it does not interfere with rotation of the outer shaft, where the ball bearing is held in that location by a magnet located in the inner shaft. Rotation of the inner shaft above a predetermined rotational speed causes the ball bearing to engage the outer shaft slot so as to cause the inner shaft to be locked to the outer shaft and rotate therewith.

The aforementioned bidirectional coupler requires that the inner shaft must have a non-zero rotational speed to dislocate the ball bearing toward the outer ring and as such prevent relative rotation between the inner and outer ring. However, when the inner shaft rotates and the ball bearing moves outwards, at some point both rings lock rather abruptly with a shock as the ball bearing suddenly engages the end portions of the slots.

SUMMARY OF THE INVENTION

The present invention aims to provide a magnetic clutch, particularly a two-way magnetic clutch or bidirectional magnetic clutch for an additive manufacturing system, allowing a drive and driven member to be coupled more smoothly and in substantially stationary fashion. A plurality of bidirectional magnetic clutches of the present invention can be utilized for obtaining a convenient magnetic clutch selection arrangement for selecting one or more feeders to be driven by a single drive shaft.

According to the present invention, a bidirectional magnetic clutch of the type defined in the preamble is provided comprising, a concentric arrangement of an inner drive member and an outer drive member enclosing the inner drive member, wherein the inner drive member and the outer drive member are rotatable relative to each other.

The inner drive member comprises at an outer circumferential surface at least two outward facing recesses and the outer drive member comprises at an inner circumferential surface at least two inward facing recesses. Each outward facing recess comprises a radially moveable roller member of ferromagnetic material and having a diameter which is smaller than a depth, i.e. an inner receiving depth, of the outward facing recess in which it is received, and wherein each inward facing recess has a depth, i.e. an outer receiving depth, which is smaller than the diameter of each roller member.

The inner drive member is further provided with a magnetic biasing system configured to magnetically bias the roller members into the outward facing recesses through a biasing magnetic field.

The bidirectional magnetic clutch further comprises a magnet actuator which is at least partially circumferentially arranged around the outer drive member and configured to engage/provide an external magnetic field for maintaining an engaged state of the bidirectional magnetic clutch in which the at least two outward facing recesses and the at least two inward facing recesses are substantially aligned/in register and the roller members are magnetically attracted into the inward facing recesses by the external magnetic field, and wherein the magnet actuator is further configured to remove the external magnetic field for maintaining a disengaged state of the bidirectional magnetic clutch in which the roller members are magnetically biased into, e.g. fully into, the outward facing recesses by the magnetic biasing system.

According to the present invention, in the disengaged state of the bidirectional magnetic clutch, each of the roller members are fully received within their respective outward facing recess and as such the inner and outer drive member can rotate relative to one another. In the engaged state of the bidirectional magnetic clutch, each of the roller members are partially received within the inward facing recesses as well as in the outward facing recess, thereby blocking relative rotation between the inner and outer drive members. As such, the bidirectional magnetic clutch is able to allow torque transfer in two rotational directions, i.e. in clockwise and counter clockwise direction.

In an embodiment, the magnetic biasing system comprises one of or more of the roller members, wherein the one or more of the roller members are magnetic roller members. In this embodiment the roller members are magnetically biased into their respective outward facing recess through a biasing magnetic field provided by the magnetic roller members and as such through magnetic interaction between the roller members. Different embodies are conceivable, for example one roller member being a permanent magnet attracting one or more other roller ferromagnetic members, or several roller members each being permanent magnets attracting each other.

In another embodiment, the magnetic biasing system comprises a permanent magnet arranged in the inner drive member and which permanent magnet is interposed between two of the at least two outward facing recesses. In this embodiment, two roller members are magnetically biased into their respective outward facing recess through magnetic interaction with the permanent magnet.

In a further aspect, the present invention relates to an extruder head for an additive manufacturing system utilizing the above-mentioned bidirectional magnetic clutch of the present invention. The extruder head comprises a first extruder nozzle, a drive shaft and a first filament feeder provided with a driven first gripper wheel configured for rotation and engaging a first filament material for movement thereof toward or away from the first extruder nozzle, wherein the extruder head further comprises a first bidirectional magnetic clutch as described above, wherein the first bidirectional magnetic clutch is arranged to engage and disengage the first gripper wheel from the drive shaft.

The bidirectional magnetic clutch of the present invention is ideally suited for use in an extruder head of an additive manufacturing system, wherein the first filament feeder can be connected to or disconnected from the drive shaft in a reliable and efficient manner for controlling movement of the first filament material to or from the first extruder nozzle.

In an embodiment, the extruder head further comprises a second extruder nozzle and a second filament feeder provided with a driven second gripper wheel configured for rotation and engaging a second filament material for movement thereof toward or away from the second extruder nozzle, wherein the extruder head further comprises a second bidirectional magnetic clutch as described above, wherein the second bidirectional magnetic clutch is arranged to engage and disengage the second gripper wheel from the drive shaft.

The extruder head of the present invention is particularly advantageous as it readily allows for an arbitrary plurality of filament feeders to be connected to and disconnected from a single common drive shaft of the extruder head. Moreover, because each of the plurality of bidirectional magnetic clutches of the extruded head allows for opposite rotations of the drive shaft, it is possible to conveniently and quickly select which filament material of a plurality of filament materials is supplied to or retracted from one of the plurality of extruder nozzles. As a result, the extruder head of the present invention provides a simple yet effective design and can be made compact as the plurality of bidirectional magnetic clutches can be arranged in a snug side-by-side arrangement along the drive shaft of the extruder head.

BRIEF DESCRIPTION OF THE DRAWINGS

The present invention will now be described by way of reference to a number of illustrative embodiments as shown in the accompanying drawings in which.

DETAILED DESCRIPTION OF THE EMBODIMENTS

Figure 1:
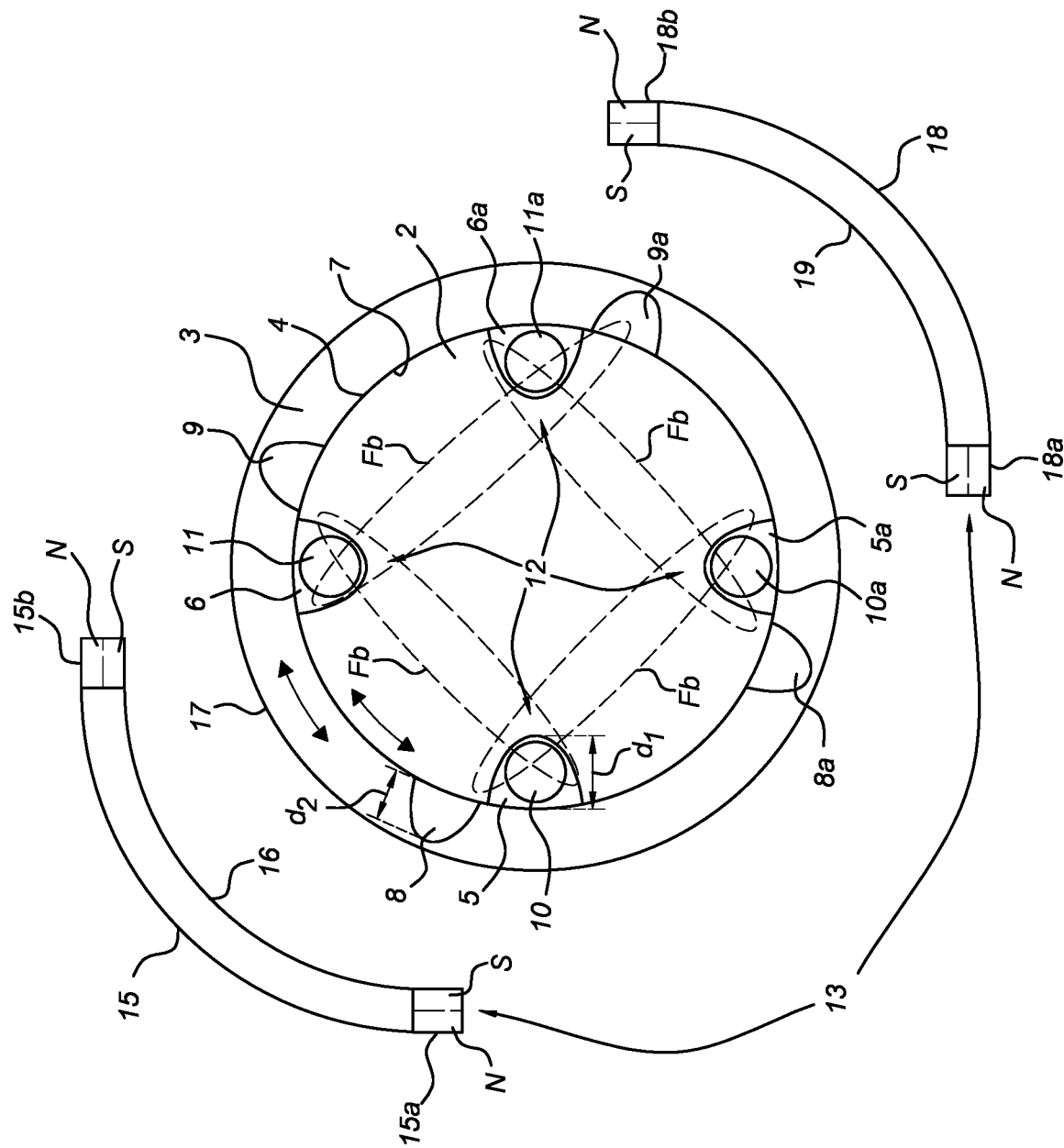
FIG. 1 shows a cross section of a disengaged bidirectional magnetic clutch according to an embodiment of the present invention.
Figure 2:
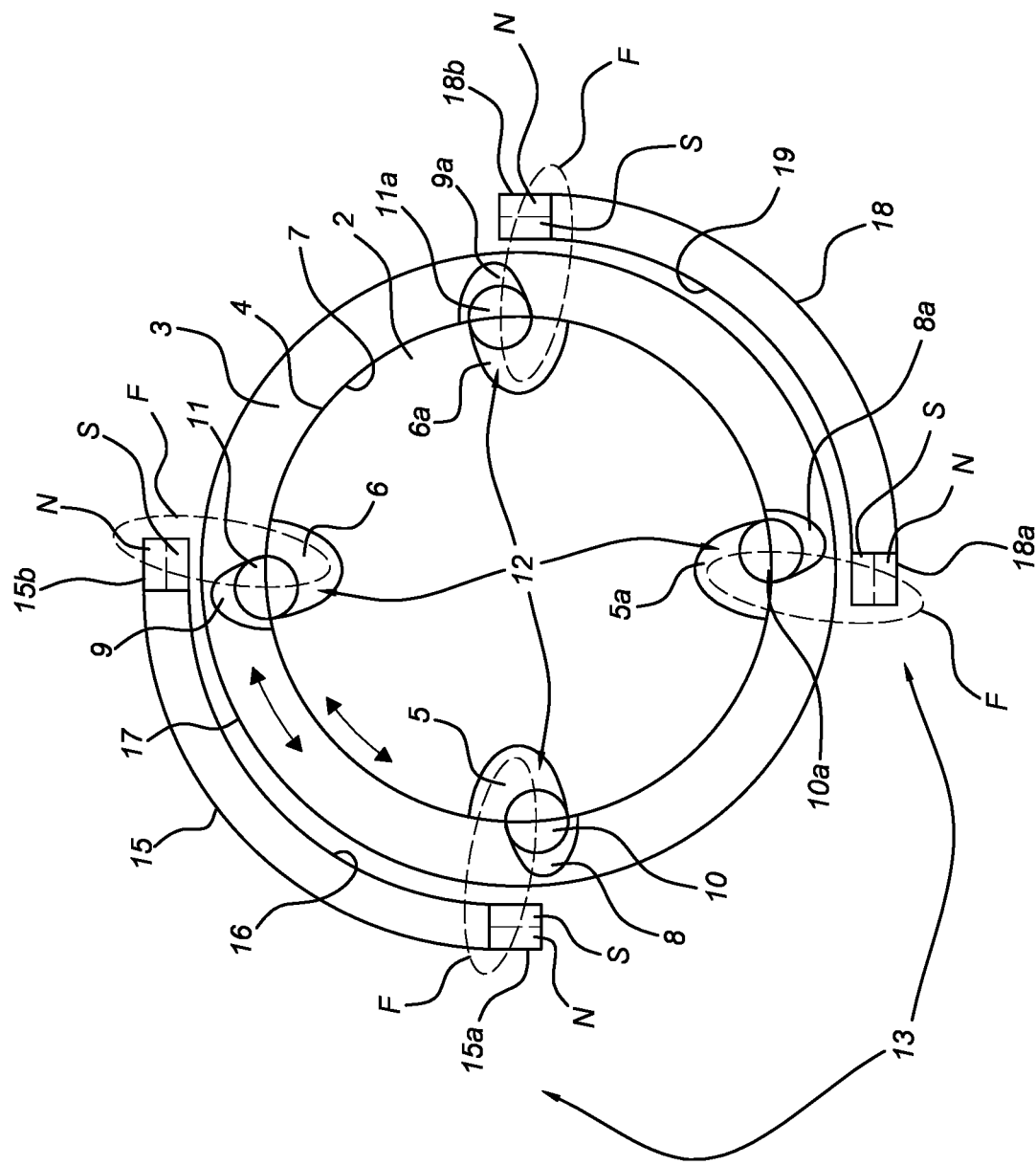
FIG. 2 shows a cross section of an engaged bidirectional magnetic clutch according to an embodiment of the present invention.

FIGS. 1 and 2 show cross sections of a disengaged and engaged bidirectional magnetic clutch 1, respectively, for an additive manufacturing system according to an embodiment of the present invention. In the embodiment shown, the bidirectional magnetic clutch comprises a concentric arrangement of an inner drive member 2, e.g. a circular inner drive member 2, and an outer drive member 3, e.g. a circular outer drive member 3, enclosing the inner drive member 2 in the cross section shown, wherein the inner drive member 2 and the outer drive member 3 are rotatable relative to each other.

The inner drive member 2 comprises at an outer circumferential surface 4 four outward facing recesses 5, 5a, 6, 6a and wherein the outer drive member 3 comprises at an inner circumferential surface 7 four inward facing recesses 8, 8a, 9, 9a. Although not shown, it should be noted that an annular gap may be present between the outer circumferential surface 4 and the inner circumferential surface 7 to minimize friction there between and to allow free rotation of the inner and outer drive member 2, 3 with respect to each other.

Each outward facing recess 5, 5a, 6, 6a comprises a radially moveable roller member 10, 10a, 11, 11a of ferromagnetic material having a diameter which is smaller than an inner receiving depth d1 of the outward facing recess 5, 5a, 6, 6a in which it is received. Further, each inward facing recess 8, 8a, 9, 9a has an outer receiving depth d2 which is smaller than the diameter of each roller member 10, 10a, 11, 11a receivable therein. In an embodiment, the roller members 10, 10a, 11, 11a may be spherical or cylindrical.

The inner receiving depth d1 should be construed as a maximum depth associated with each outward facing recess 5, 5a, 6, 6a for receiving a roller member 10, 10a, 11, 11a. By saying that the diameter a roller member 10, 10a, 11, 11a is smaller than the inner receiving depth d1 implies that the roller member 10, 10a, 11, 11a will not protrude beyond the outer circumferential surface 4 when fully received within its associated outward facing recess 5, 5a, 6, 6a.

The outer receiving depth d2 should likewise be construed as a maximum depth associated with each inward facing recess 8, 8a, 9, 9a for receiving a roller member 10, 10a, 11, 11a. By saying that the outer receiving depth d2 is smaller than the diameter of each roller member 10, 10a, 11, 11a implies that a roller member will protrude beyond the inner circumferential surface 7 when fully received within an inward facing recess 8, 8a, 9, 9a.

It should be noted that the outward facing recesses 5, 5a, 6, 6a and inward facing recesses 8, 8a, 9, 9a may have varying shapes and as such the inner receiving depth d1 and outer receiving depth d2 need not be seen as a deepest point of the recesses. For example, as shown in FIGS. 1 and 2, each of the recesses 5, 5a, 6, 6a, 8, 8a, 9, 9a may be tapered such that the roller members 10, 10a, 11, 11a may not be able to actually touch a deepest point of the recesses. So as mentioned earlier, the inner and outer receiving depths d1, d2 must be construed as indicating a maximum depth at which the roller members 10, 10a, 11, 11a can be received within the recesses regardless of the actual geometry thereof.

A further shown in FIG. 1, the inner drive member 2 is provided with a magnetic biasing system 12 configured to magnetically bias the roller members 10, 10a, 11, 11a into the outward facing recesses 8, 8a, 9, 9a through a biasing magnetic field Fb provided by the magnetic biasing system 12. So, by virtue of the ferromagnetic material of the roller members 10, 11, the magnetic biasing system 12 biases each of the roller members 10, 11 into their respective outward facing recess 5, 5a, 6, 6a through magnetic engagement.

The bidirectional magnetic clutch may further comprise a magnet actuator 13 at least partially circumferentially arranged around the outer drive member 3 and wherein the magnet actuator 13 is configured to provide/engage an external magnetic field F for maintaining an engaged state of the bidirectional magnetic clutch, see FIG. 2, and in which engaged state the four outward facing recesses 5, 5a, 6, 6a and the four inward facing recesses 8, 8a, 9, 9a are substantially aligned and wherein the roller members 10, 10a, 11, 11a are magnetically attracted into the inward facing recesses 8, 8a, 9, 9a by the external magnetic field F. The magnet actuator 13 is further configured to disengage or remove the external magnetic field F for maintaining a disengaged state of the bidirectional magnetic clutch, see FIG. 1, in which the roller members 10, 10a, 11, 11a are magnetically biased (pulled) into the outward facing recesses 5, 5a, 6, 6a by the magnetic biasing system 12.

According to the present invention, in the disengaged state of the bidirectional magnetic clutch 1 as shown in FIG. 1, each of the roller members 10, 10a, 11, 11a are fully received within their respective outward facing recess 5, 5a, 6, 6a because of the magnetic biasing system 12. As a result, the outer drive member 3 can rotate freely relative to the inner drive member 2. In the engaged state of the bidirectional magnetic clutch as shown in FIG. 2, each of the roller members 10, 10a, 11, 11a are partially received in an aligned inward facing recess 8, 9 as well as partially received in their respective outward facing recess 5, 6. As shown, once each of the roller members 10, 10a, 11, 11a is partially received within an aligned inward facing recess 8, 8a, 9, 9a both clockwise and counter clockwise rotation is inhibited and as such the bidirectional magnetic clutch of the present invention operates as a bidirectional magnetic clutch.

In an advantageous embodiment the magnetic biasing system 12 comprises at least two roller members, wherein the roller members are permanent magnetic roller members. In this embodiment, the magnetic biasing system 12 is formed by roller members 10, 10a, 11, 11a that magnetically bias themselves into their respective outward facing recess 5, 5a, 6, 6a through the biasing magnetic field Fb provided by the roller members 10, 10a, 11, 11a. This embodiment provides a simple design wherein the roller members 10, 10a, 11, 11a exhibit self-biasing behavior through the magnetic engagement there between, so that in the disengaged state of the bidirectional magnetic clutch, the roller members 10, 10a, 11, 11a mutually attract each other into their respective outward facing recess 5, 5a, 6, 6a.

Note that when the bidirectional magnetic clutch is in the engaged state shown in FIG. 2, then the magnet actuator 13 provides an external magnetic field F which is sufficiently strong to overcome a biasing force acting on each of the roller members 10, 10a, 11, 11a as provided by the magnetic biasing system 12 and as such the magnet actuator 13 allows the roller members 10, 10a, 11, 11a to be pulled into the inward facing recesses 8, 8a, 9, 9a when the outward and inward facing recesses are aligned.

Figure 3:
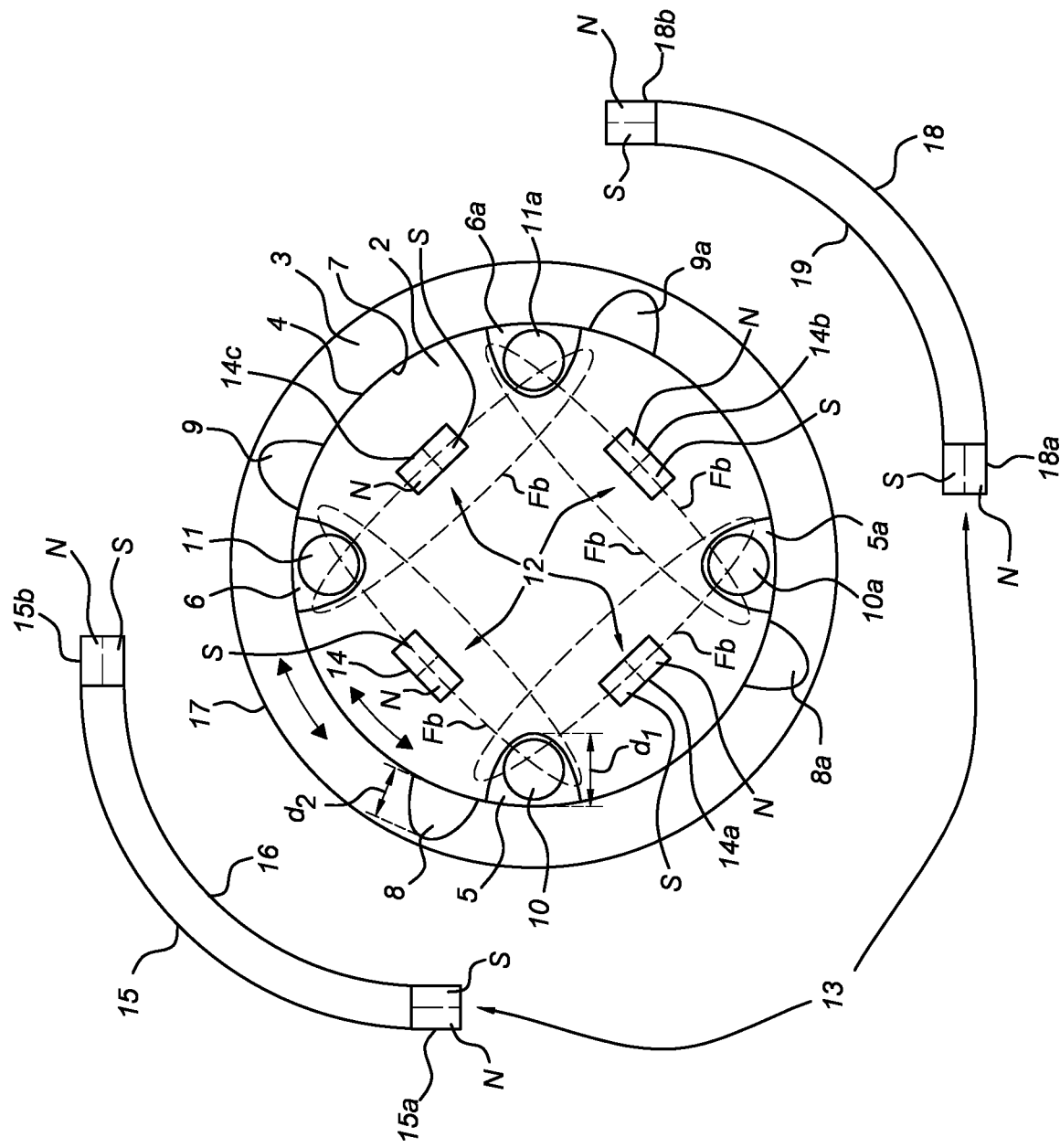
FIG. 3 shows a cross section of a disengaged bidirectional magnetic clutch according to another embodiment of the present invention.
Figure 4:
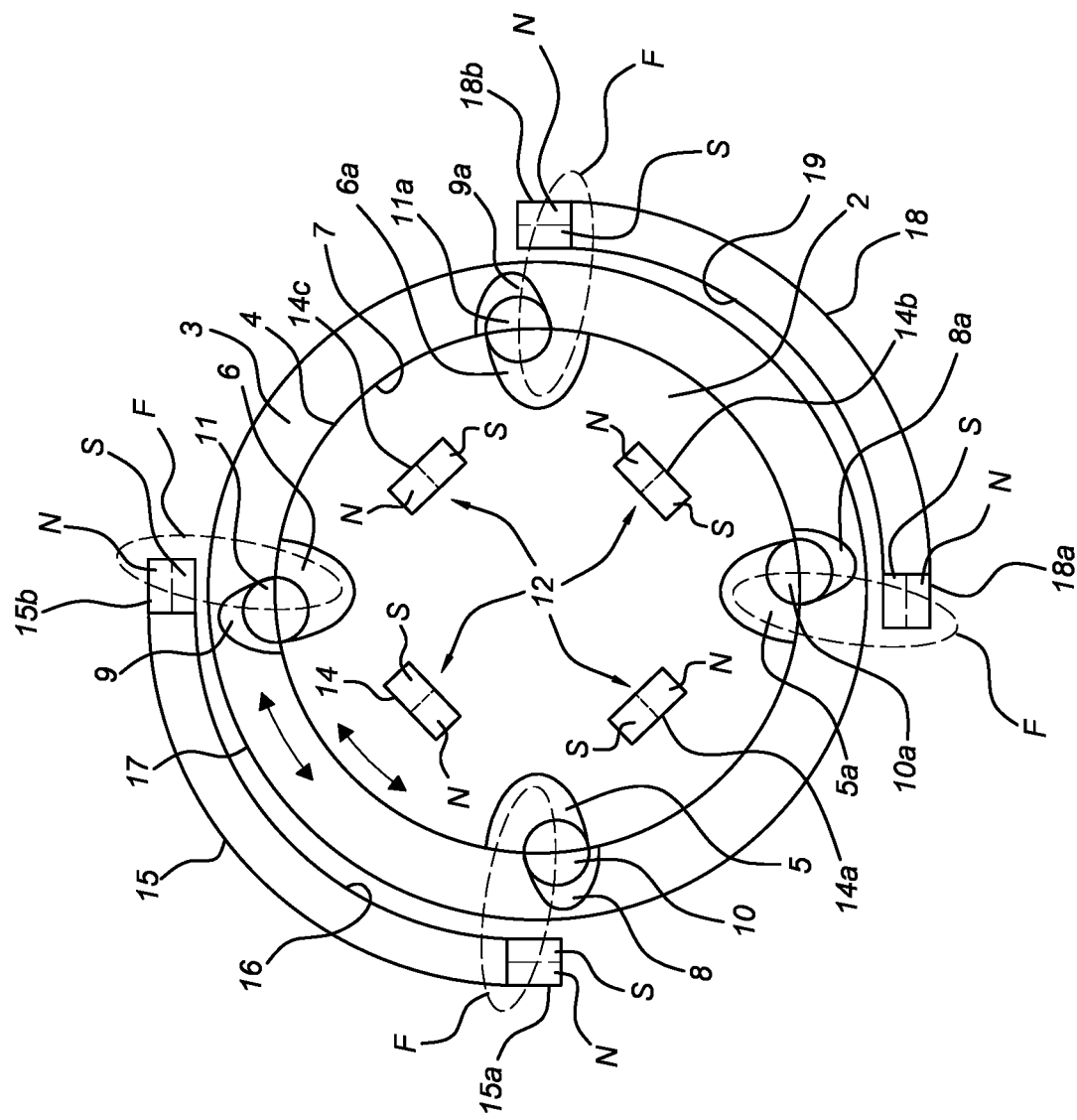
FIG. 4 shows a cross section of an engaged bidirectional magnetic clutch according to another embodiment of the present invention.

FIGS. 3 and 4 show cross sections of a disengaged and engaged bidirectional magnetic clutch, respectively, according to another embodiment of the present invention. In the embodiments shown, the magnetic biasing system 12 may comprises a permanent magnet 14 interposed between the two outward facing recesses 5, 5a, 6, 6a of the inner drive member 2. In this embodiment the permanent magnet 14 comprises opposing magnetic poles "N" and "S" each of which faces one of the roller members 10, 10a, 11, 11a. In this embodiment the permanent magnet 14 provides the biasing magnetic field Fb for magnetically biasing the roller members 10, 10a, 11, 11a into their respective outward facing recess 5, 5a, 6, 6a to maintain the disengages state of the bidirectional magnetic clutch when the external magnetic field F is removed by the magnet actuator 13. Note that in this embodiment the four roller members 10, 10a, 11, 11a need not be magnetic themselves but by virtue of their ferromagnetic material, the permanent magnets 14, 14a, 14b, 14c interposed between the roller members 10, 10a, 11, 11a ensure that the biasing magnetic field Fb interacts with both roller members 10, 10a, 11, 11a and as such pull the roller members 10, 10a, 11, 11a into their respective outward facing recess 5, 5a, 6, 6a.

It is important to note that from FIGS. 1 to 4 it is clear that the bidirectional magnetic clutch of the present invention may utilize an arbitrary plurality of roller members 10, 11, 10a, 11 a and a corresponding plurality of outward facing recesses 5, 5a, 6, 6a and inward facing recesses 8, 8a, 9, 9a.

In an exemplary embodiment, as shown in FIGS. 1 and 2, for an arbitrary plurality of roller members 10, 11, 10a, 11 a, the magnetic biasing system 12 may comprise the arbitrary plurality of roller members 10, 11, 10a, 11 a wherein each of the roller members 10, 11, 10a, 11 a are permanent magnetic roller members 10, 11, 10a, 11a that exhibit self-biasing behaviour through mutually magnetic interaction to remain seated within their respective outward facing recess 5, 6, 5a, 6a when the bidirectional magnetic clutch is in the disengages state.

In a further exemplary embodiment, as shown in FIGS. 3 and 4, for an arbitrary plurality of roller members 10, 11, 10a, 11a, i.e. in this case four, the magnetic biasing system 12 may comprise a plurality of permanent magnets 14, 14a, 14b, 14c each of which is interposed between a pair of outward facing recesses 5, 6, 5a, 6a. For example, for four outward facing recesses 5, 6, 5a, 6a there may be provided four permanent magnets 14, 14a, 14b, 14c for forming the magnetic biasing system 12 and wherein each of the four permanent magnets 14, 14a, 14b, 14c is interposed between a pair of outward facing recesses 5, 6, 5a, 6a.

As depicted in FIGS. 3 and 4, for a plurality of permanent magnets 14, 14a, 14b, 14c forming the magnetic biasing system 12, in an embodiment each of the permanent magnets 14, 14a, 14b, 14c comprises a north N and south S magnetic pole, and wherein the N and S magnetic poles of the plurality of permanent magnets 14, 14a, 14b, 14c are alternately arranged. For example, given a first permanent magnet 14 interposed between a first pair of outward facing recesses 5, 6, and given a second permeant magnet 14b interposed between a second pair of outward facing recess 5, 5a, then the N magnetic pole of the first permanent magnet 14 faces the S magnetic pole of the second permanent magnet 14a. Such an alternating arrangement of magnetic poles N and S allows for a sufficiently strong biasing magnetic field Fb to be provided by the magnetic biasing system 12 for biasing (i.e. attracting) each of the plurality of roller members 10, 11, 10a, 11 a into their respective outward facing recesses 5, 6, 5a, 6a.

Note that in an embodiment it is conceivable that the magnetic biasing system 12 may comprise a combination of a plurality of permanent magnet roller members 10, 11, 10a, 11 a and a plurality of permanent magnets 14, 14a, 14b, 14c, each of which is interposed between a pair of outward facing recesses 5, 6, 5a, 6a. This embodiment would allow for a combination of having magnetic self-biasing behavior of the plurality of roller members 10, 11, 10a, 11a, and magnetic biasing of each of the plurality of roller members 10, 11, 10a, 11a by the plurality of permanent magnets 14, 14a, 14b, 14c, into their respective outward facing recesses 5, 6, 5a, 6a.

With reference to the FIGS. 1 to 4, in an embodiment the magnet actuator 13 may comprise a magnetic engagement member 15 which is moveable between a distal radial position relative to the outer drive member 3 and a proximal radial position relative to the outer drive member 3, wherein the external magnetic field F is provided by the permanent magnet engagement member 15 in the proximal radial position for maintaining the engaged state of the bidirectional magnetic clutch 1 and wherein the external magnetic field F is removed by the permanent magnet engagement member 15 in the distal radial position for maintaining the disengaged state of the bidirectional magnetic clutch 1. In an embodiment, in the proximal radial position a gap exists between the permanent magnet engagement member 15 and the outer drive member 3, allowing the outer drive member 3 to rotate with respect to the permanent magnet engagement member 15 whilst the bidirectional magnetic clutch is in the engaged state. So, in this embodiment the permanent magnet engagement member 15 does not come into mechanical/physical contact with the outer drive member 3.

In his embodiment, by simply moving the permanent magnet engagement member 15 toward the outer drive member 3 to the proximal radial position allows the bidirectional magnetic clutch to be in the engaged state as the external magnetic field F will interact with the two roller members 10, 11 and as such allow each of the roller members 10, 11 to be moved and pulled into an inward facing recess 8, 9 when aligned with an outward facing recess 5, 6. Since the outer receiving depth d2 of each of the inward facing recesses 8, 9 is smaller than a diameter of each of the two roller members 10, 11 allows relative rotation between the inner and outer drive members 2, 3 to be blocked in all directions as each of the two roller members 10, 11 is partially received in an outward facing recess 5, 6 as well as partially received in an inward facing recess 8, 9.

Conversely, by simply moving the permanent magnet engagement member 15 away from the inner drive member 3 toward the distal radial position allows the bidirectional magnetic clutch to be in the disengaged state as each of the two roller members 10, 11 is biased into their respective outward facing recess 5, 6 by the magnetic biasing system 12.

In an embodiment, the permanent magnet engagement member 15 may comprise two (or more) permanent magnets 15a, 15b that are positioned such that they engage the two roller members 10, 11 for providing the external magnetic field F. As depicted, each of the two permanent magnets 15a, 15b have a north magnetic pole N and south magnetic pole S, one of which is arranged to face one of the two roller members 10, 11. In the depicted exemplary embodiments, the south magnetic pole S of each permanent magnets 15a, 15b is arranged to face a roller member 10, 11. In another embodiment the north magnetic pole N of each permanent magnets 15a, 15b may be arranged to face a roller member 10, 11.

As further depicted in the FIGS. 1 to 4, in an embodiment the permanent magnet engagement member 15 may comprises a curved inner surface 16 conformal to, i.e. shaped in conformal fashion, a curved outer surface 17 of the outer drive member 3. In this embodiment the curved inner surface 16 of the permanent magnet engagement member 15 allows snug proximal engagement thereof with the curved outer surface 17 of the outer drive member 3 to maximize field strength of the external magnetic field F for interaction with the two roller members 10, 11 such that the engaged state of the bidirectional magnetic clutch is further ensured when the outward facing recesses 5, 6 and inward facing recesses 8, 9 are aligned.

In an embodiment, the magnet actuator 13 may comprise two magnetic engagement members 15, 18 arranged on opposite sides of the outer drive member 3 and wherein each of the two magnetic engagement members 15, 18 is moveable between a distal radial position and a proximal radial position relative to the outer drive member 3, wherein the external magnetic field F is provided by the two magnetic engagement members 15, 18 in the proximal radial position for maintaining the engaged state of the bidirectional magnetic clutch 1 and wherein the external magnetic field F is removed by the two magnetic engagement members 15, 18 in the distal radial position for maintaining the disengaged state of the bidirectional magnetic clutch.

In this embodiment it is possible that each of the two roller members 10, 11 interact with a different permanent magnet engagement member 15, 18 so that a circumferential distribution of the two outward facing recesses 5, 6 and the two roller members 10, 11 received therein can be chosen according to specifications. For example, in case the two outward facing recesses 5, 6 are arranged on opposite sides of the inner drive member 2, i.e. at 180° degree angle between the two outward facing recesses 5, 6, then having two oppositely arranged magnetic engagement members 15, 18 allows for accurate attraction of each roller member 10, 11 separately in the engages state of the bidirectional magnetic clutch.

Having two oppositely arranged magnetic engagement members 15, 18 is also advantageous for any plurality of outward facing recesses 5, 6, 5a, 6a and roller members 10, 11, 10a, 11a received therein. For example, in the embodiments shown two magnetic engagement members 15, 18 are provided on opposite sides of the outer drive member 3 so that each of the two magnetic engagement members 15, 18 may interact with one or more roller members of the four roller members 10, 11, 10a, 11a as shown, thereby allowing the magnet actuator 13 to magnetically interact with all four roller members 10, 11, 10a, 11a for a given circumferential distribution thereof along the inner drive member 2.

From the above it is clear that in a general embodiment the magnet actuator 13 may be circumferentially arranged around the outer drive member 3 over 360° degrees to provide an external magnetic field F distributed over 360° degrees as well, e.g. by means of the oppositely arranged two magnetic engagement members 15 covering e.g. 180° degrees each. Such 360° degree distribution of the external magnetic field F allows effective magnetic interaction with any plurality of roller members 10, 11, 10a, 11a that are circumferentially arranged around the inner drive member 2. However it is noted that the actuator may alternatively be arranged only partially circumferentially so as to be able to suitable actuate the roller members.

In an embodiment, each of the two magnetic engagement members 15, 18 comprises a curved inner surface 16, 19 which is conformal to, i.e. shaped in conformal fashion, a curved outer surface 17 of the outer drive member 3. In this embodiment both magnetic engagement members 15, 18 allow snug proximal engagement with the curved outer surface 17 of the outer drive member 3 to maximize field strength of the external magnetic field F for interaction with the two roller members 10, 11. Of course, this embodiment likewise allows snug proximal engagement with the curved outer surface 17 of the outer drive member 3 to maximize field strength of the external magnetic field F for interaction with any plurality of roller members 10, 11, 10a, 11a, e.g. four as depicted, such that the engaged state of the bidirectional magnetic clutch is further ensured when a corresponding plurality of outward facing recesses 5, 6, 5a, 6a and inward facing recesses 8, 9, 8a, 9a are aligned.

In an embodiment, each of the two magnetic engagement members 15, 18 may comprise two (or more) permanent magnets 15a, 15b, 18a, 18b that are positioned such that they can engage the two roller members 10, 11 or any plurality of rollers members 10, 11, 10a, 11a for providing the external magnetic field F. Each of the permanent magnets 15a, 15b, 18, 18b have a north magnetic pole N and south magnetic pole S, one of which is arranged to face a roller member 10, 11, 10a, 11. In the depicted embodiments, the south magnetic pole S of each permanent magnet 15a, 15b, 18a, 18b is arranged to face a roller member 10, 11, 10a, 11a. In another embodiment the north magnetic pole N of each permanent magnets 15a, 15b, 18a, 18b may be arranged to face a roller member 10, 11, 10a, 11a.

Figure 5:
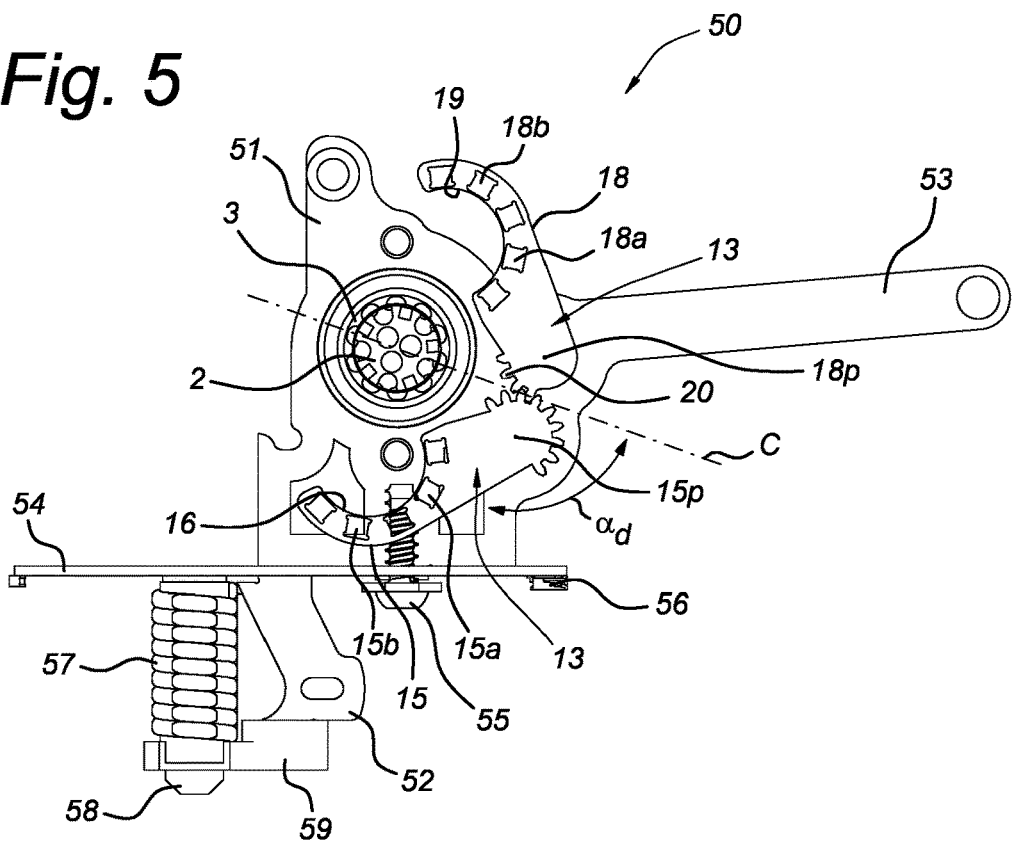
FIG. 5 shows a cut away view of a nozzle lifting assembly with a pivotally operated magnet actuator of a disengaged bidirectional magnetic clutch according to an embodiment of the present invention.
Figure 6:
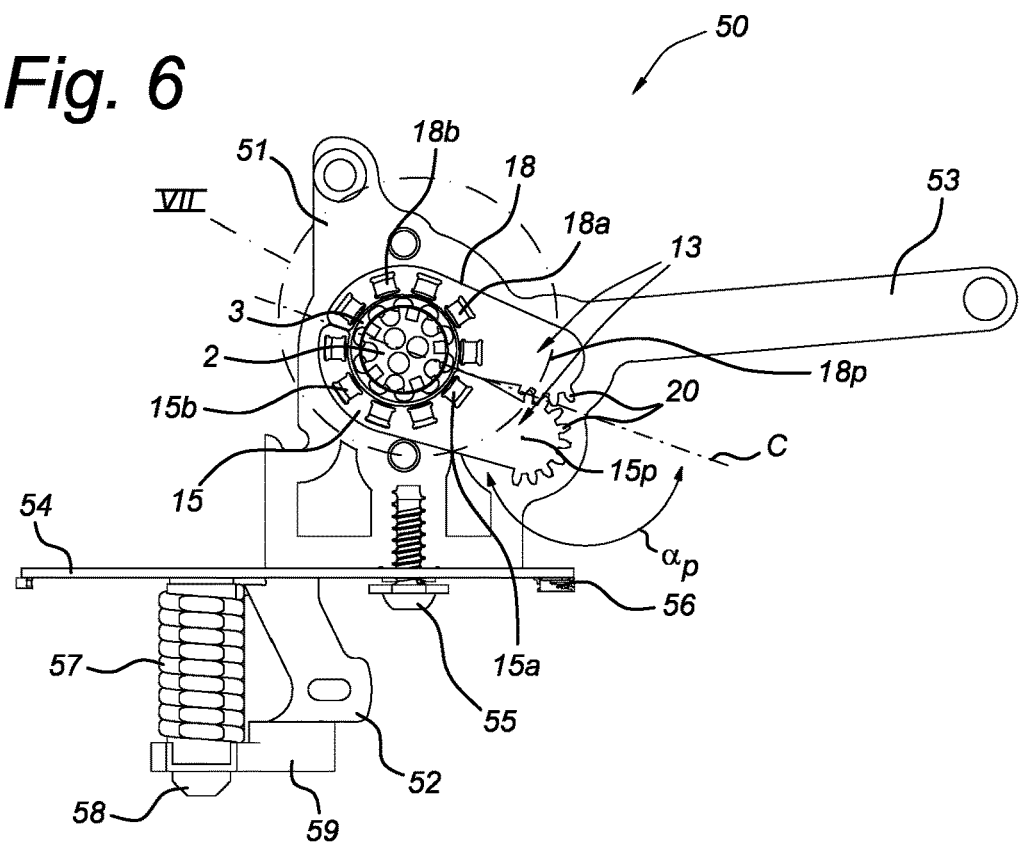
FIG. 6 shows a cut away view of a nozzle lifting assembly with a pivotally operated magnet actuator of an engaged bidirectional clutch according to an embodiment of the present invention.

Turning to FIGS. 5 and 6, each of which show a cut away view of a nozzle lifting assembly 50 with the pivotally operated engagement members 15, 18 of the actuator 13 of a disengaged and engaged bidirectional magnetic clutch, respectively, according to an embodiment of the present invention.

In this embodiment, the nozzle lifting assembly 50 comprises a main body 51 which is pivotably arranged around the drive shaft 2. The main body 51 comprises a nozzle support arm 52 and a lever arm 53. The main body 51 may be formed by a metal plate having the appropriate cut-outs as shown in FIG. 5. At a bottom side of the main body 51, a connection plate 54 is arranged which may comprise a printed circuit board for controlling the nozzle heating and sensing. The connection plate 54 is coupled to the frame 51 by means of a bolt 55. The connection board 54 may comprise a connector 56 for connection of the board 54 to a power supply or control device (not shown). Below the connection plate 54, a print core heater 57 is arranged, which may comprise an inductive heating element. FIGS. 5 and 6 also shown a nozzle 58 for depositing print material on a build plate (not shown). The nozzle 58 is fixed by way of a nozzle fixing member 59.

In the embodiment shown in FIGS. 5 and 6, each of the two magnetic engagement members 15, 18 are pivotally arranged around an associated pivot point 15p, 18p. The engagement members 15, 18 may be pivotable between a distal angle $\alpha_d$ corresponding to the distal radial position and a proximal angle $\alpha_p$ corresponding to the proximal radial position, thereby allowing for a simple design for moving the oppositely arranged two magnetic engagement members 15, 18 between the distal and proximal radial position with respect to the outer drive member 3. Note that in this embodiment, both the distal angle $\alpha_d$ and the proximal angle $\alpha_p$ may be measured with respects to a line C at which the oppositely arranged two magnetic engagement members 15, 18 meet in the engaged state of the bidirectional magnetic clutch, see e.g. FIG. 6.

As further shown, in an embodiment the two magnetic engagement members 15, 18 may be connected through a geared arrangement 20 configured to synchronously rotate the two magnetic engagement members 15, 18 in opposite rotational directions between the distal angle $\alpha_d$ and proximal angle $\alpha_p$. This geared arrangement ensures that the external magnetic field F applied by the two magnetic engagement members 15, 18 causes substantially equal increase in attraction of all roller members when the two magnetic engagement members 15, 18 move toward the proximal radial position.

Referring back to the FIGS. 1 to 4, in a general embodiment the external magnetic field F exhibits or has associated radially oriented magnetic field lines substantially aligned with the two outward facing recesses 5, 6 and the two inward facing recesses 8, 9 in the engaged state of the bidirectional magnetic clutch, thereby providing for optimized and stronger attraction of each of the roller members 10, 11 into the inward facing recesses 8, 9.

Note that the magnet actuator 13 need not utilize permanent magnets for providing the external magnetic field F. For example, in an alternative embodiment the magnet actuator 13 is an electromagnet actuator configured to electronically provide and remove the external magnetic field F corresponding to the engaged state and disengaged state of the bidirectional magnetic clutch. Such an electromagnet actuator may comprise a circumferential arrangement of a plurality of electromagnets around the outer drive member 3 to be activated for attracting the roller members 10, 11, 10a, 11b.

As mentioned above, when the bidirectional magnetic clutch is in an engaged state, the two roller members 10, 11 are partially received in corresponding outward facing recesses 5, 6 and inward facing recesses 8, 9 and maintained in such a position as long as the external magnetic field F is applied. For transferring torque between the inner and outer drive members 2, 3, each of the two roller members 10, 11 comes into contact with the inner and outer drive members 2, 3 and forces are transferred via contact areas between the two roller members 10, 11 and the inner and outer drive members 2, 3.

Figure 7:
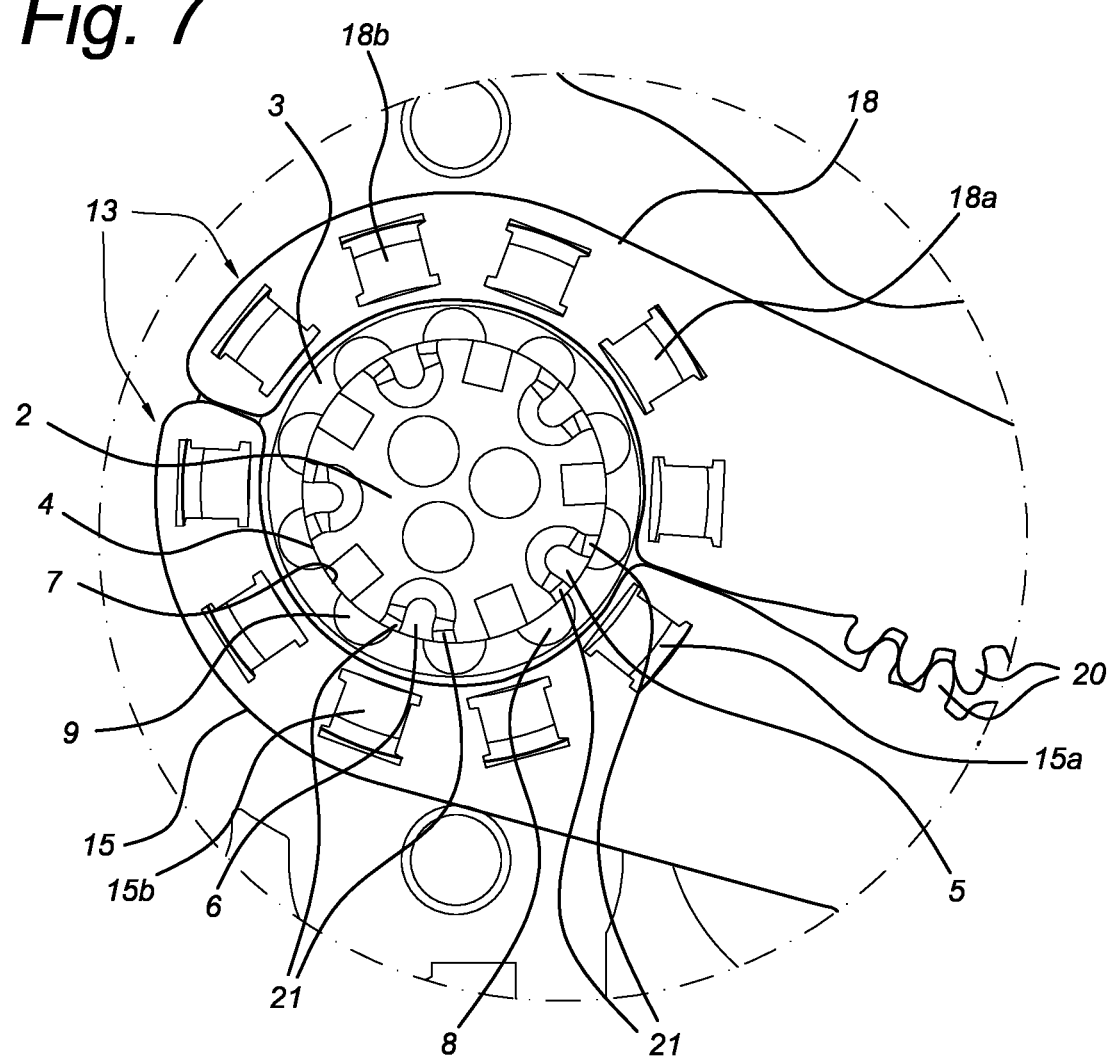
FIG. 7 shows a detailed view of a part of FIG. 6.

FIG. 7 shows a detailed view of a part of FIG. 6. In the embodiment shown, each of the outward facing recesses 5, 6 of the inner drive member 2 comprises two opposing concave inner edge surfaces 21 connecting to the outer circumferential surface 4 of the inner drive member 2, and wherein the roller members 10, 11 (not shown) each comprise a convex outer surface which is conformal, i.e. shaped in conformal fashion, to the two concave inner edge surfaces 21. In this embodiment, each roller member 10, 11 comprises a convex outer surface for engagement in conformal fashion with each concave inner edge surface 21 of the outward facing recess 5, 6 in which it is received. As a result, a larger contact area between each of the roller members 10, 11 and the inner drive member 2 is achieved and as such an improved force distribution is obtained when torque is transmitted between the inner and outer drive member 2, 3.

According to the present invention, the magnet actuator 13 is circumferentially arranged around the outer drive member 3 and configured to provide the external magnetic field F for maintaining an engaged state of the bidirectional magnetic clutch. As described above, the magnet actuator 13 may comprise two opposing magnetic engagement members 15, 18 or, alternatively, the magnet actuator 13 may be an electromagnet actuator 13. In either case, the external magnetic field F should exhibit good magnetic interaction with each of the two roller members 10, 11 or any plurality of roller members 10, 11, 10a, 11a.

To ensure that good magnetic interaction is provided between the magnet actuator 13 and the two roller members 10, 11, or any plurality of roller members 10, 11, 10a, 11a, an embodiment is provided wherein the inner and outer drive members 2, 3 are made of a plastic material. In this embodiment the low relative magnetic permeability of the plastic material does not interfere with magnetic interaction between the two roller members 10, 11 and the magnet actuator 13 providing the external magnetic field F in the engaged state of the bidirectional magnetic clutch.

In a further aspect, the present invention also relates to an extruder head for an additive manufacturing system utilizing one or more bidirectional magnetic clutches as described above. In particular, the bidirectional magnetic clutch 1 of the present invention is suited for connecting and disconnecting a filament feeder to or from a drive shaft for controlling movement of filament material to or from an extruder nozzle. The bidirectional magnetic clutch of the present invention is particularly useful for connecting and disconnected a plurality of filament feeders from a common drive shaft, thereby selecting which filament material is to be fed to or retracted from a particular extruder nozzle of a plurality of extruder nozzles.

Figure 8:
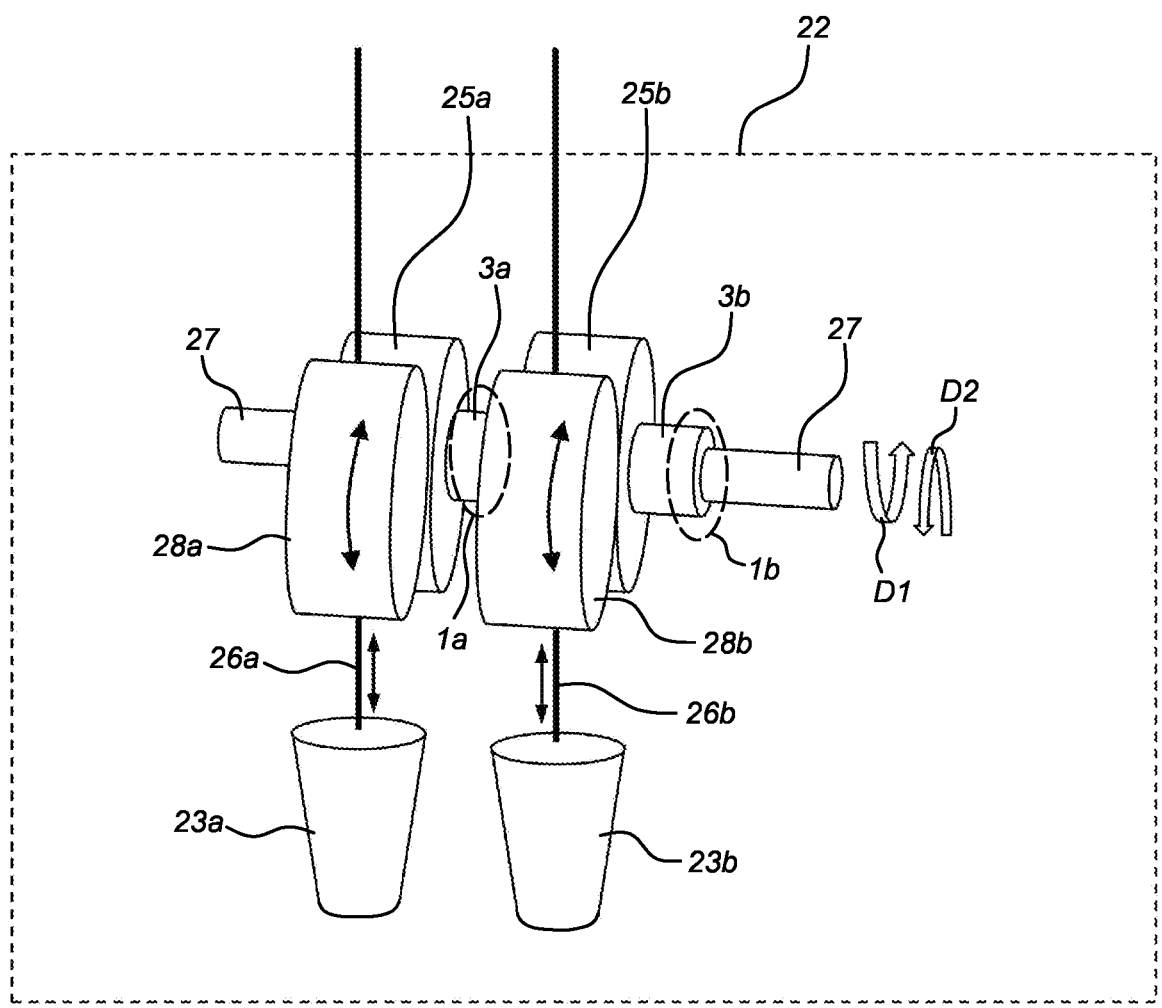
FIG. 8 schematically shows an embodiment of an extruder head for an additive manufacturing system according to an embodiment of the present invention.

In view of the above, FIG. 8 schematically shows an exemplary embodiment of an extruder head 22 for an additive manufacturing system according to the present invention. In the embodiment shown, the extruder head 22 comprises a first extruder nozzle 23a and a first filament feeder 24a provided with a driven first gripper wheel 25a configured for rotation and engaging a first filament material 26a for movement thereof toward or away (e.g. retracted) from the first extruder nozzle 23a. The extruder head 22 further comprises with a first bidirectional magnetic clutch 1a of the present invention as described above in light of FIGS. 1 to 7 and which is connected to the first gripper wheel 25a and a drive shaft 27 of the extruder head 22, and wherein the first bidirectional magnetic clutch 1a is arranged to engage and disengage the first gripper wheel 25a from the drive shaft 27. In this embodiment, the first bidirectional magnetic clutch 1a of the present invention allows reliable and fast connection and disconnection of the first gripper wheel 25a from the drive shaft 27 through the magnet actuator 13 (not shown). Moreover, the first bidirectional magnetic clutch 1a allows the drive shaft 27 to rotate in opposite directions D1 or D2 such that the first filament material 26a can either be supplied to the first extruder nozzle 23a or retracted therefrom, see the various double arrows in FIG. 8 to indicate opposite directions of rotation that are possible. In an embodiment, the first filament feeder 24a may be provided with a first idler wheel 28a configured for rotation and for pressing the first filament material 26a against the first gripper wheel 25a for improved traction thereof.

In the embodiment of FIG. 8, the first gripper wheel 25a is connected to an outer drive member 3a of the first bidirectional magnetic clutch 1a and the drive shaft 27 functions as the inner drive member 2 of the first bidirectional magnetic clutch 1a. In an alternative embodiment the first gripper wheel 25a may be connected to the inner drive member 2 of the first bidirectional magnetic clutch 1a and where the drive shaft 27 functions as the outer drive member 3a of the first bidirectional magnetic clutch 1. In either embodiment, in the engaged state of the first bidirectional magnetic clutch 1a the drive shaft 27 may rotate in both opposite directions D1 or D2 such that the first gripper wheel 25a is rotated in opposite directions for either supplying the first filament material 26a to the first extruder nozzle 23a or retracting the first filament material 26a therefrom.

The bidirectional magnetic clutch of the present invention is ideally suited for connecting and disconnected a plurality of filament feeders from a drive shaft of an extruder head, thereby providing a convenient magnetic clutch selection arrangement for selecting one or more driven gripper wheels to be driven by a single common drive shaft.

For example, in the embodiment of FIG. 8, the extruder head 22 further comprises a second extruder nozzle 23b and a second filament feeder 24b provided with a driven second gripper wheel 25b configured for rotation and engaging a second filament material 26b for movement thereof toward or away from the second extruder nozzle 23b. The extruder head 22 further comprises a second bidirectional magnetic clutch 1b of the present invention as described above in light of FIGS. 1 to 7. The second bidirectional clutch 1b comprises an outer drive member 3b that is connected to the second gripper wheel 25b. The second bidirectional magnetic clutch 1b is arranged to engage and disengage the second gripper wheel 25b from the drive shaft 27.

In this embodiment it is possible to select whether the first or second filament material 26a, 26b is to be fed or retracted from the first or second extruder nozzle 23a, 23b, respectively. To do so, the magnet actuator (not shown in FIG. 8) of each of the first and second bidirectional magnetic clutches 1a, 1b may be activated or deactivated accordingly, thereby connecting or disconnecting the first and second gripper wheels 25a, 25b from the drive shaft 27 in corresponding fashion.

Note that in an embodiment it is conceivable that the first and second bidirectional magnetic clutches 1a, 1b may be engaged simultaneously, so that the drive shaft 27 drives both the first and second gripping wheels 25a, 25b simultaneously for dispensing both the first and second filament material 26a, 26b simultaneously.

In an embodiment, the second filament feeder 24b may be provided with a second idler wheel 28b configured for rotation and for pressing the second filament material 26b against the second gripper wheel 25b for improved traction thereof.

From the above it can be seen that the extruder head 22 of the present invention readily allows for an arbitrary plurality of filament feeders 24a, 24b to be connected or disconnected from a single common drive shaft 27 of the extruder head 22. Moreover, as each of the plurality of bidirectional magnetic clutches 1a, 1b allows for opposite rotations D1, D2 of the drive shaft 27, it is possible to conveniently and quickly select which of the plurality of filament materials 26a, 26b is supplied to or retracted from one of the plurality of extruder nozzles 23a, 23b. As a result, the extruder head 22 of the present invention exhibits a simpler design and can be made very compact as the plurality of bidirectional magnetic clutches 1a, 1b can be arranged in a snug side-by-side arrangement along the drive shaft 27.

Figure 9:
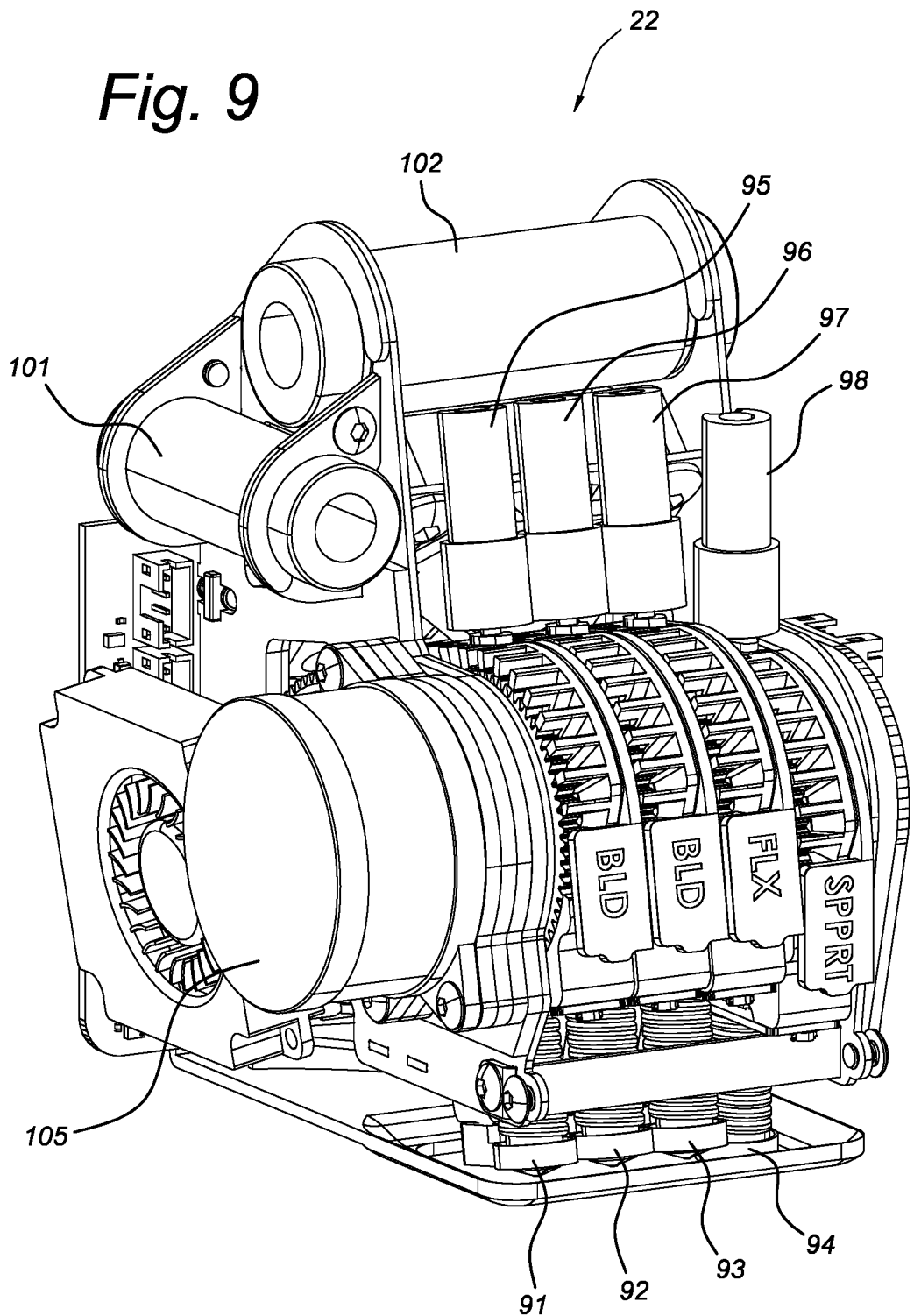
FIG. 9 shows a perspective view of part of an extruder head according to an embodiment of the invention.

FIG. 9 shows a perspective view of part of an extruder head 22 according to an embodiment of the invention. The extruder head 22 is also referred to as printer head 22. In FIG. 9 an outer housing of the extruder head 22 is removed so as to show some of the interior of the extruder head 22. The extruder head 22 in this embodiment comprises four nozzle lifting assemblies each having a print nozzle 91, 92, 93 and 94, and associated filament inlets 95, 96, 97 and 98.

The extruder head 22 in this embodiment further comprises a printer head frame comprising a first guiding cylinder 101 and a second guiding cylinder 102 for cooperation with rods of a gantry (not shown). Furthermore, the extruder head 22 comprises a motor 105 arranged to rotate a drive shaft 27, see also FIG. 10, which extends through the four nozzle lifting assemblies. As can be seen from FIG. 9, one of the nozzles, i.e. the fourth nozzle 94, has been lowered while the three others have been lifted.

Figure 10:
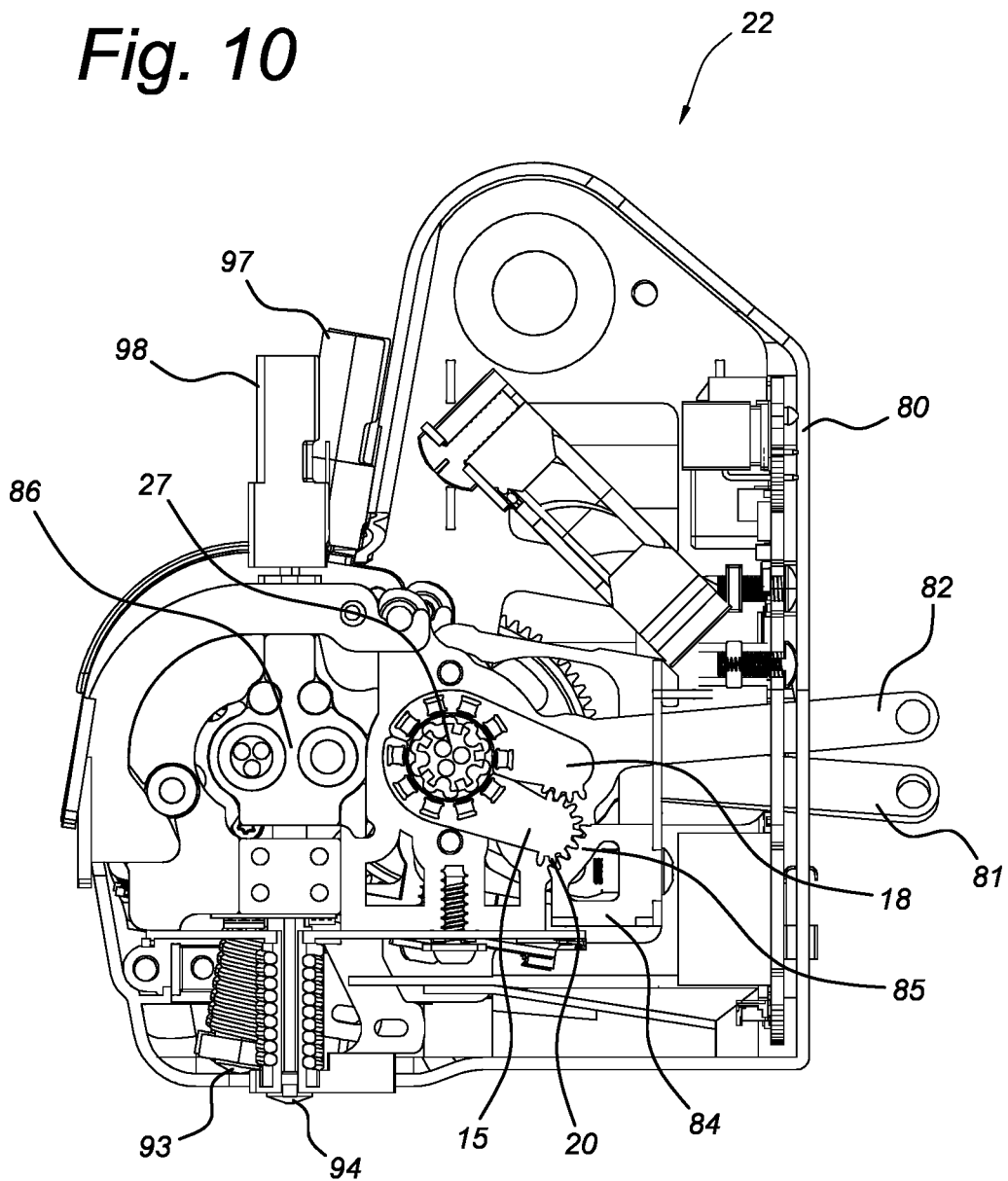
FIG. 10 shows a cut away view of the extruder head of FIG. 9.

FIG. 10 shows a cut away view of the extruder head of FIG. 9 also now showing a housing 80 of the extruder head 22. In FIG. 10 only parts of two nozzle lifting assemblies are visible, i.e. the ones lifting the nozzles 93 and 94. In this embodiment, the nozzle lifting assemblies each comprise a lever arm 81, 82. The lever arms 81, 82 can be manipulated using an activation mechanism (not shown) so as to rotate the nozzle lifting assemblies around the drive shaft 27. In the cut out view a filament feeder 86 is shown which is arranged to feed filament coming through inlet 98 to the nozzle 94. FIG. 10 also shows the two magnetic engagement members 15, 18 of the actuator. The engagement members 15, 18 are pivotably arranged on a main body of the lifting assembly as was explained above with reference to FIGS. 5 and 6. In this embodiment, the print head 22 comprises a plurality of gear plates 84 each comprising teeth 85. The number of gear plates 84 resembles the number of nozzle lifting assemblies. So if the print head 22 comprises four lifting assemblies, the number of gear plates will be four. The gear plates 84 are fixed relative to the print head 22. As can be seen from FIG. 10, some of the teeth of the geared arrangement 20 interact with teeth 85 of the gear plate 84. When pressing down the lever arm 82 from an upper state to a lower state, the corresponding lifting assembly will be rotated around the drive shaft 27. Due to the interaction of the geared arrangement 20 with the teeth 85 of the gear plate 84, the lower engagement member 15 will rotate relative to the main body of the lifting assembly. As a consequence, also the other engagement member, i.e. engagement member 18, will rotate, and as a result, the two engagement members 15, 18 will spread and get the clutch to the disengaged state as was shown in FIG. 5. Similarly, when lifting the lever arm 82 from the lower state to the upper state, the opposite occurs and the engagement members 15, 18 will get the clutch into the engaged state.

As a result of the above described mechanism, a feeder of a lifted nozzle gets deactivated while a feeder of a lowered nozzle gets activated. So, by manipulation of the lever arms 81, 82, both the nozzles 92, 93 get into the correct position, while at the same time the feeders 86 are properly activated or deactivated.

In the situation shown in FIG. 10, the magnetic engagement members 15, 18 are in the engaged state, like the state shown in FIG. 6. Now the associated clutch is in the disengaged state and a rotation of the drive shaft 27 is not transferred to the gears (not shown in FIG. 10) of the feeder 86, meaning that the feeder 86 is deactivated.

The present invention has been described above with reference to a number of exemplary embodiments as shown in the drawings. Modifications and alternative implementations of some parts or elements are possible, and are included in the scope of protection as defined in the appended claims.

The invention claimed is:

1. A bidirectional magnetic clutch for an additive manufacturing system, comprising
   a concentric arrangement of an inner drive member and an outer drive member enclosing the inner drive member, the inner drive member and the outer drive member being rotatable relative to each other,
   wherein the inner drive member comprises at an outer circumferential surface at least two outward facing recesses, and wherein the outer drive member comprises at an inner circumferential surface at least two inward facing recesses,
   wherein each outward facing recess comprises a radially moveable roller member of ferromagnetic material and having a diameter which is smaller than an inner receiving depth (d1) of the outward facing recess in which it is received, and wherein each inward facing recess has an outer receiving depth (d2) which is smaller than the diameter of each roller member,
   wherein the inner drive member is further provided with a magnetic biasing system configured to magnetically bias the roller members into the outward facing recesses through a biasing magnetic field (Fb), the bidirectional magnetic clutch further comprising:
   a magnet actuator at least partially circumferentially arranged around the outer drive member and configured to provide an external magnetic field (F) for maintaining an engaged state of the bidirectional magnetic clutch in which the at least two outward facing recesses and the at least two inward facing recesses are substantially aligned and the roller members are magnetically attracted into the inward facing recesses (8,9) by the external magnetic field (F), and
   wherein the magnet actuator is further configured to remove the external magnetic field (F) for maintaining a disengaged state of the bidirectional magnetic clutch in which the roller members are magnetically biased into the outward facing recesses by the magnetic biasing system.

2. The bidirectional magnetic clutch according to claim 1, wherein the magnetic biasing system comprises one or more of the roller members, wherein the one or more of the roller members are magnetic roller members.

3. The bidirectional magnetic clutch according to claim 1, wherein the magnetic biasing system comprises a permanent magnet arranged in the inner drive member and interposed between two of the at least two outward facing recesses.

4. The bidirectional magnetic clutch according to claim 1, wherein the magnet actuator comprises a magnetic engagement member moveable between a distal radial position and a proximal radial position relative to the outer drive member, wherein the external magnetic field (F) is provided by the magnetic engagement member in the proximal radial position for maintaining the engaged state of the bidirectional magnetic clutch and wherein the external magnetic field (F) is removed by the magnetic engagement member in the distal radial position for maintaining the disengaged state of the bidirectional magnetic clutch.

5. The bidirectional magnetic clutch according to claim 4, wherein the magnetic engagement member comprises a curved inner surface shaped in conformal fashion to a curved outer surface of the outer drive member.

6. The bidirectional magnetic clutch according to claim 1, wherein the magnet actuator comprises two magnetic engagement members arranged on opposite sides of the outer drive member and wherein each of the two magnetic engagement members is moveable between a distal radial position and a proximal radial position relative to the outer drive member,
   wherein the external magnetic field (F) is provided by the two magnetic engagement members in the proximal radial position for maintaining the engaged state of the bidirectional magnetic clutch and wherein the external magnetic field (F) is removed by the two magnetic engagement members in the distal radial position for maintaining the disengaged state of the bidirectional magnetic clutch.

7. The bidirectional magnetic clutch according to claim 6, wherein each of the two magnetic engagement members comprises a curved inner surface shaped in conformal fashion to a curved outer surface of the outer drive member.

8. The bidirectional magnetic clutch according to claim 6, wherein each of the two magnetic engagement members are pivotally arranged between a distal angle ($\alpha d$) corresponding to the distal radial position and a proximal angle ($\alpha p$) corresponding to the proximal radial position.

9. The bidirectional magnetic clutch according to claim 8, wherein the two magnetic engagement members are connected through a geared arrangement configured to synchronously rotate the two magnetic engagement members in opposite rotational directions between the distal angle ($\alpha d$) and proximal angle ($\alpha p$).

10. The bidirectional magnetic clutch according to claim 1, wherein the external magnetic field (F) has associated radially oriented magnetic field lines substantially aligned with the outward facing recesses and the inward facing recesses in the engaged state of the bidirectional magnetic clutch.

11. The bidirectional magnetic clutch according to claim 1, wherein the magnet actuator is an electromagnet actuator configured to electronically engage and disengage the external magnetic field (F) corresponding to the engaged state and disengaged state of the bidirectional magnetic clutch respectively.

12. The bidirectional magnetic clutch according to claim 1, wherein each of the at least two outward facing recesses of the inner drive member comprises two opposing concave inner edge surfaces connecting to the outer circumferential surface of the inner drive member, and wherein the roller members each comprise a convex outer surface which is shaped in conformal fashion to the two concave inner edge surfaces.

13. The bidirectional magnetic clutch according to claim 1, wherein the inner drive member and the outer drive member are made of a plastic material.

14. An extruder head for an additive manufacturing system, comprises a first extruder nozzle, a drive shaft and a first filament feeder provided with a driven first gripper wheel configured for rotation and engaging a first filament material for movement thereof toward or away from the first extruder nozzle, wherein the extruder head further comprises
- a first bidirectional magnetic clutch comprising a concentric arrangement of an inner drive member and an outer drive member enclosing the inner drive member, the inner drive member and the outer drive member being rotatable relative to each other,
  - wherein the inner drive member comprises at an outer circumferential surface at least two outward facing recesses, and wherein the outer drive member comprises at an inner circumferential surface at least two inward facing recesses,
  - wherein each outward facing recess comprises a radially moveable roller member of ferromagnetic material and having a diameter which is smaller than an inner receiving depth (d1) of the outward facing recess in which it is received, and wherein each inward facing recess has an outer receiving depth (d2) which is smaller than the diameter of each roller member,
  - wherein the inner drive member is further provided with a magnetic biasing system configured to magnetically bias the roller members into the outward facing recesses through a biasing magnetic field (Fb), the bidirectional magnetic clutch further comprising:
    - a magnet actuator at least partially circumferentially arranged around the outer drive member and configured to provide an external magnetic field (F) for maintaining an engaged state of the bidirectional magnetic clutch in which the at least two outward facing recesses and the at least two inward facing recesses are substantially aligned and the roller members are magnetically attracted into the inward facing recesses by the external magnetic field (F), and
  - wherein the magnet actuator is further configured to remove the external magnetic field (F) for maintaining a disengaged state of the bidirectional magnetic clutch in which the roller members are magnetically biased into the outward facing recesses by the magnetic biasing system,
- wherein the first bidirectional magnetic clutch is arranged to engage and disengage the first gripper wheel from the drive shaft.

15. The extruder head according to claim 14, further comprising a second extruder nozzle and a second filament feeder provided with a driven second gripper wheel configured for rotation and engaging a second filament material for movement thereof toward or away from the second extruder nozzle, wherein the extruder head further comprises
- a second bidirectional magnetic clutch, wherein the second bidirectional magnetic clutch is arranged to engage and disengage the second gripper wheel from the drive shaft.

\* \* \* \* \*